May 7, 1929. R. POLLAK 1,712,399
CRYSTAL CUTTING MACHINE
Filed Jan. 24, 1928
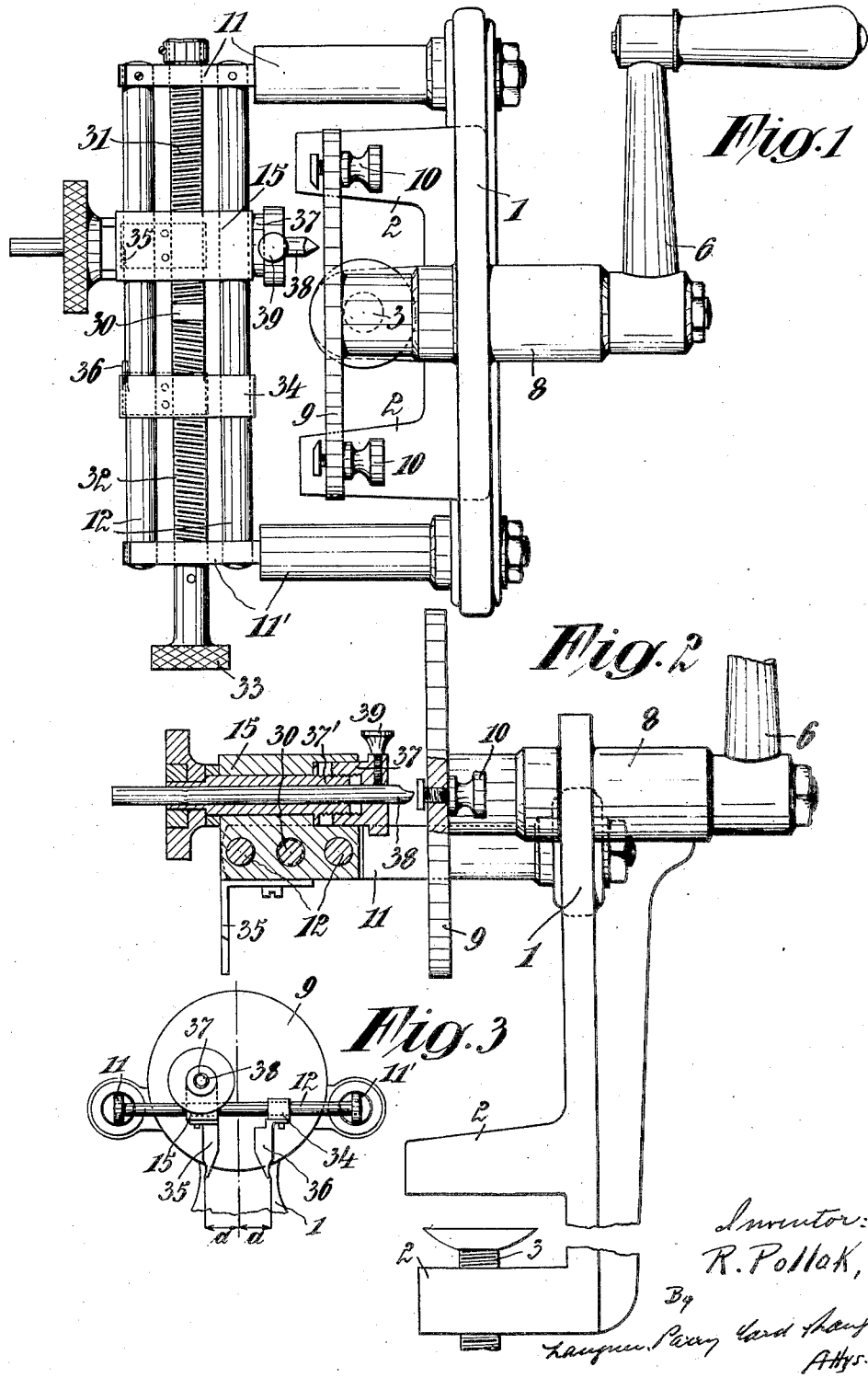

Patented May 7, 1929.

1,712,399

UNITED STATES PATENT OFFICE.

ROBERT POLLAK, OF VIENNA, AUSTRIA, ASSIGNOR TO THE FIRM ROBERT POLLAK & CO., OF VIENNA, AUSTRIA.

CRYSTAL-CUTTING MACHINE.

Application filed January 24, 1928, Serial No. 249,182, and in Austria September 28, 1927.

Apparatus for cutting dial covers for watches from transparent or translucent material have been proposed which operate on the principle of a turning lathe and in which a disc of some transparent material secured to a revolving support is cut by a tool adapted to be adjusted and fixed in any adjusted position. The attending to and the handling of such apparatus is complicated and more particularly the adjustment of the tool to the exact diameter of the cover to be cut necessitates a number of manipulations requiring a comparatively large expenditure of time. Moreover in such apparatus the measuring of the diameter required and the adjustment of the tool takes place in two separate hand operations, so that an accurate adjustment is difficult. The apparatus according to the invention performs these two operations automatically.

This result is obtained by providing two gage stops movable the one relatively to the other in the manner of a measuring gage to one of which is fixed the tool, so that by adjusting the arms to the diameter of the dial cover wing or bezel the point of the tool when in the operative position, is at the proper distance from the geometrical axis of the work holding element, that is to say, the disc carrying the blank, which distance is determined by the diameter of the bezel as measured by the distance apart of the gage stops. The tool is thus located at the proper radial distance from said axis to cut a blank of the right size to fit the opening in the bezel.

In the drawing a constructional form of the subject matter of the invention is illustrated by way of example.

Fig. 1 shows the apparatus in plan view, Fig. 2 in side elevation partly in section and Fig. 3 in front elevation.

1 is a frame adapted to be clamped in position by jaws 2 and a screw 3 and carrying the crank 6 mounted directly on the shaft 8 of the supporting disc 9. 10 are clamping screws for clamping in position on the disc or work holding element 9 the material or blank to be cut. The carrier 12 for the tool slide is secured to arms 11, 11'. Now according to the invention on the carrier a screw spindle 30 is rotatably mounted having two opposite threads 31, 32 of equal pitch. 33 is an operating button provided on the screw spindle not shown in Fig. 3. On the thread 31 is mounted the tool slide 15 guided along the spindle; on the thread 32 a slide 34 is arranged. On each of the slides a downwardly projecting gage stop 35, 36 is provided, the two slides being so adjusted on the two threads that the gage stops are at equal distances $a$ from the axis of the work holding element 9 (Fig. 3).

The tool slide 15 which as above described is combined with one of the gage stops, is provided with a bore perpendicular to the work holding element 9, from this bore projects outwardly the screw 37' serving for axially adjusting the tool holder 37. The tool holder 37 has in turn an axial bore into which is introduced the tool 38 and clamped in position by the clamping screw 39. Preferably the tool is arranged at the level of the axis of the supporting disc 9 and the operative edge of the stop 35 is in the vertical plane passing through the axis of the tool.

If now a dial cover has to be cut corresponding to the diameter of a given bezel one proceeds in the following manner:

The bezel is pushed over the stops 35, 36 and these are moved away from each other by turning the screw spindle 30 until they contact with diametrically opposite points of the inside of the bezel. The operating edges of the stops then are at equal distances from the axis of the disc and moreover the knife moved simultaneously with the stop 35 is at a distance from the axis of the disc equal to the radius of the dial cover to be cut. Then a sheet of the transparent material is clamped to the work holding element 9 by means of the screws 10 a tool is clamped in the holder 37 by means of the screw 39 and the holder 37 is moved axially in the slide 15 by the screw 37' towards the disc to be cut. By turning the crank the cut is brought about.

As will be understood any hand operation capable of interfering with the accuracy of the cut is avoided by the present invention. It will also be understood that any two of the three elements, the gage stop, combined gage stop and dial holder, and work holding element are movable with respect to the third element for carrying out the objects of the invention, the essential requirement being that the nature and the extent of movement of the movable parts be such as always to maintain the mid-point between the gage stops coincident with the axis of relative rotation of the rotatable member.

What I claim is:

1. In a device for cutting covers to fit various sized annular bezels, using the bezel as a template, two units, one unit including a work holding element, for holding the blank from which the cover is to be cut, the other unit comprising a pair of cooperable elements, one element being a gage stop and the other element being a combined gage stop and tool holder, means for moving the gage stops toward and away from one another for engageing the bezel, to determine the diameter of the template, the tool holder being arranged to hold a tool in operative proximity to said work holding element, one of said units being rotatable relative to the other unit, and means connecting said units whereby the mid-point between the gage stops is located coincident with the axis of relative rotation of said units, two of the said elements being so movably arranged with respect to the third of the said elements as to maintain the said mid-point between the gage stops at all times coincident with the said axis.

2. In a device for cutting covers to fit various sized annular bezels, using the bezel as a template, two units, one unit including a work holding element for holding the blank from which the cover is to be cut, the other unit comprising a pair of cooperable elements, one element being a gage stop and the other element being a combined gage stop and tool holder, said gage stops being engageable with the bezel to determine the diameter of the template, the tool holder being arranged to hold a tool in operative proximity to said work holding element, one of said units being rotatable relative to the other unit, means connecting said units whereby the mid-point between the gage stops is located coincident with the axis of relative rotation of said units, and means for moving said gage stops with respect to said work holding element, in opposite directions and at the same rate, so as to maintain the said mid-point between the gage stops at all times coincident with the said axis.

3. In a device for cutting covers to fit various sized annular bezels, using the bezel as a template, two units, one unit including a work holding element for holding the blank from which the cover is to be cut, the other unit comprising a pair of cooperable elements, one element being a gage stop, and the other element being a combined gage stop and tool holder, said gage stops being engageable with the bezel to determine the diameter of the template, the tool holder being arranged to hold a tool in operative proximity to said work holding element, one of said units being rotatable relative to the other unit, a frame connecting said units whereby the mid-point between the gage stops is located coincident with the axis of relative rotation of said units, and means for moving said gage stops with respect to said work holding element in opposite directions and at the same rate, so as to maintain the said mid-point between the gage stops at all times coincident with the said axis, said means comprising a screw spindle mounted on said frame having opposite threads of the same pitch, a slide on each of said threads, one slide carrying one of the said gage stops and the other slide carrying the other said gage stops and the tool holder.

In testimony whereof I have affixed my signature.

ROBERT POLLAK.